United States Patent [19]

Hollaway, Jr.

[11] Patent Number: 4,678,455

[45] Date of Patent: Jul. 7, 1987

[54] METHOD OF MAKING A FIBER-LOADED POLYMERIC SHEET

[75] Inventor: Gerald C. Hollaway, Jr., Springfield, Mo.

[73] Assignee: Dayco Products, Inc., Dayton, Ohio

[21] Appl. No.: 912,032

[22] Filed: Sep. 26, 1986

Related U.S. Application Data

[62] Division of Ser. No. 574,439, Jan. 27, 1984, Pat. No. 4,634,413, which is a division of Ser. No. 281,153, Jul. 7, 1981, Pat. No. 4,445,949.

[51] Int. Cl.$^4$ ............................ F16G 1/10; F16G 5/08
[52] U.S. Cl. .................................. 474/263; 474/268
[58] Field of Search ............... 474/263, 268, 271, 250; 156/138

[56] References Cited

U.S. PATENT DOCUMENTS 4,434,019  2/1984  Hollaway, Jr. ............... 474/263
4,634,413  1/1987  Hollaway, Jr. ............... 474/263

Primary Examiner—Stephen J. Novosad
Assistant Examiner—Thuy M. Bui
Attorney, Agent, or Firm—Joseph V. Tassone

[57] ABSTRACT

A method of making a fiber-loaded polymeric sheet and power transmission belts utilizing same are provided wherein the sheet comprises a substantially solid polymeric matrix having fibers embedded therein and wherein the fibers comprise between 40% and 70% by weight of the sheet and at least 70% of the fibers are disposed in substantially parallel relation.

20 Claims, 16 Drawing Figures

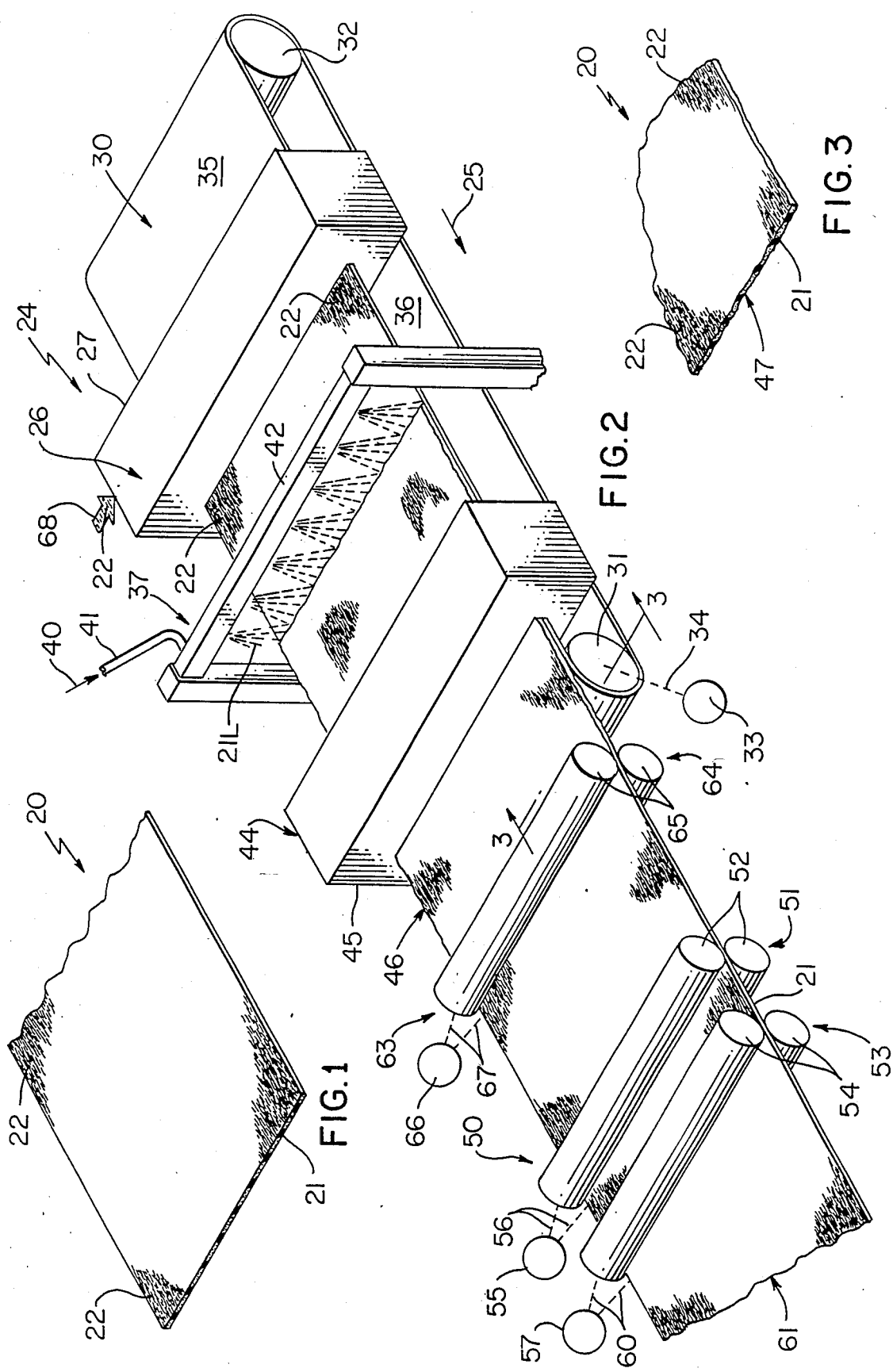

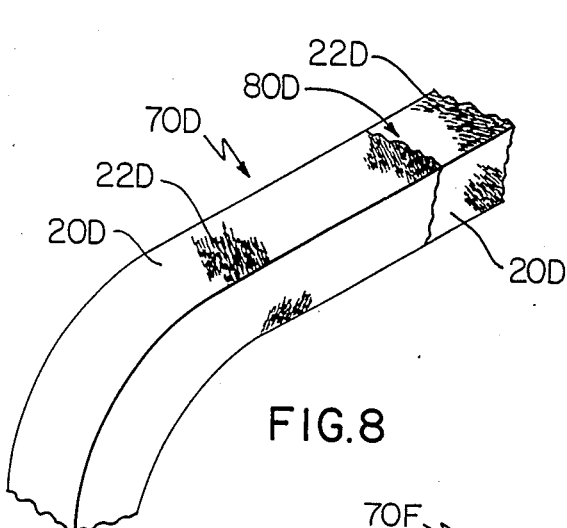
FIG. 8
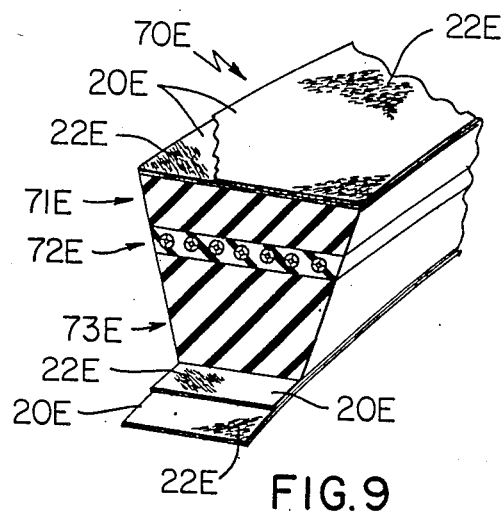
FIG. 9
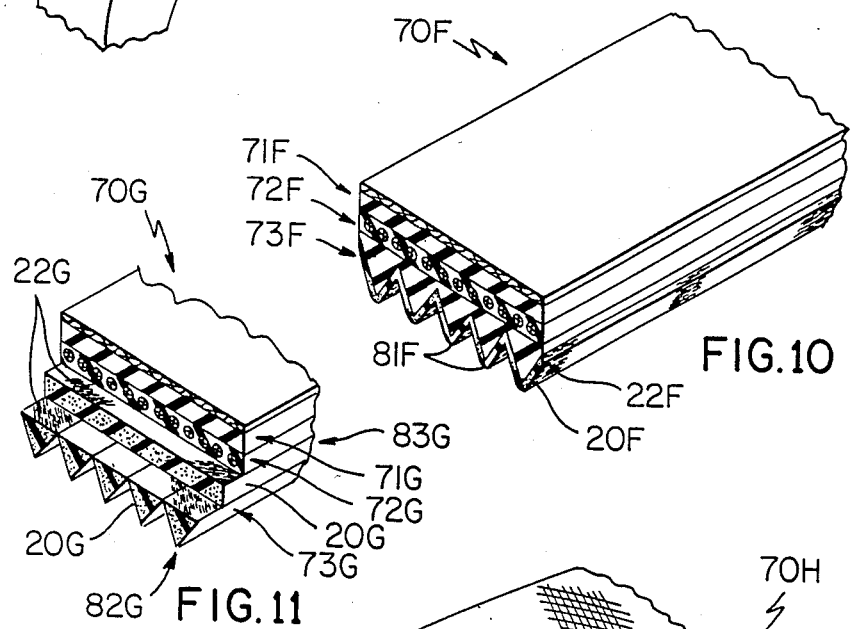
FIG. 10
FIG. 11
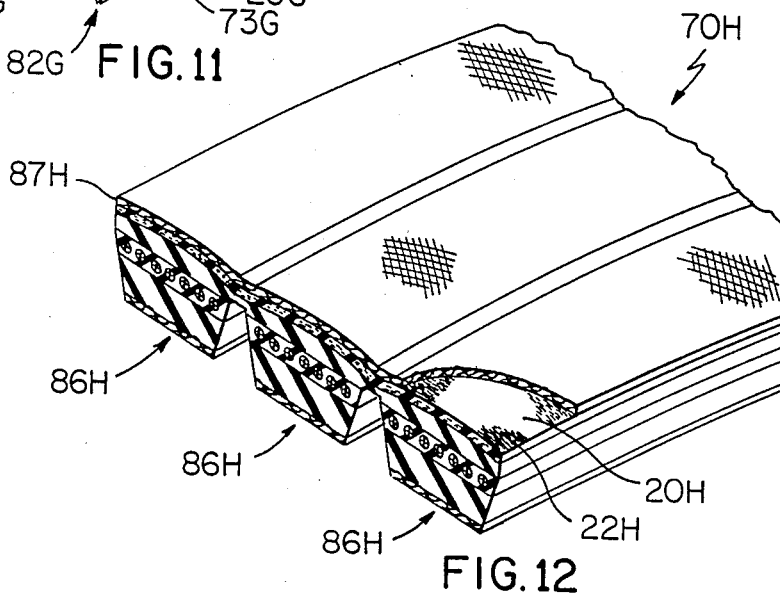
FIG. 12

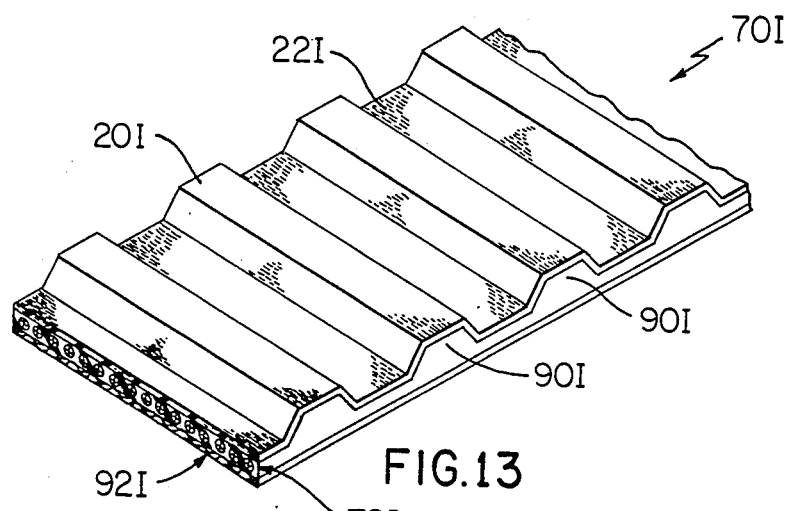
FIG.13
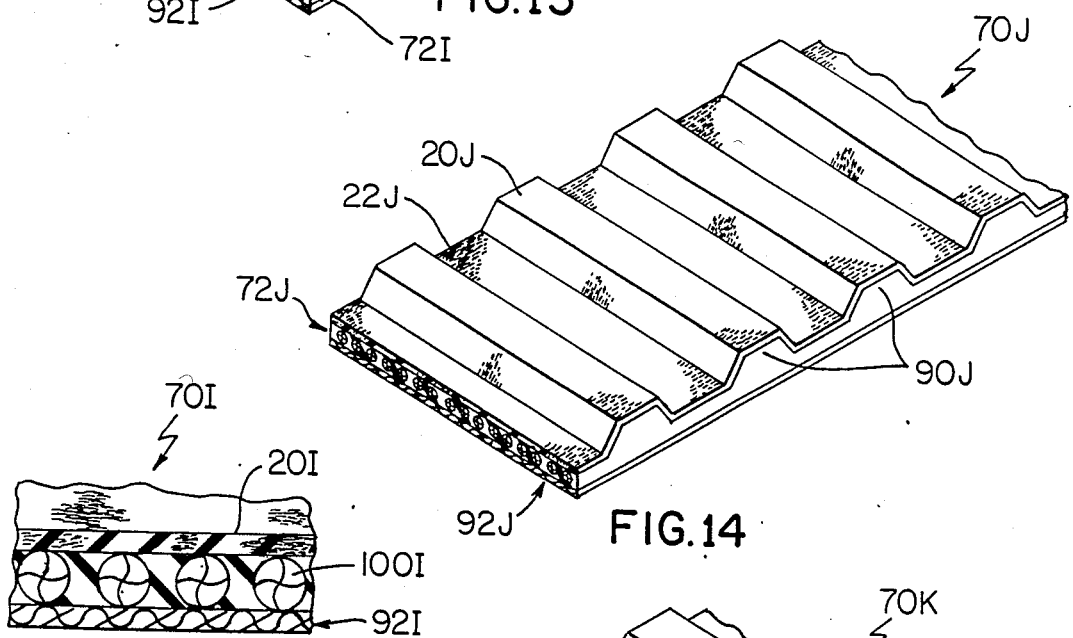
FIG.16
FIG.14
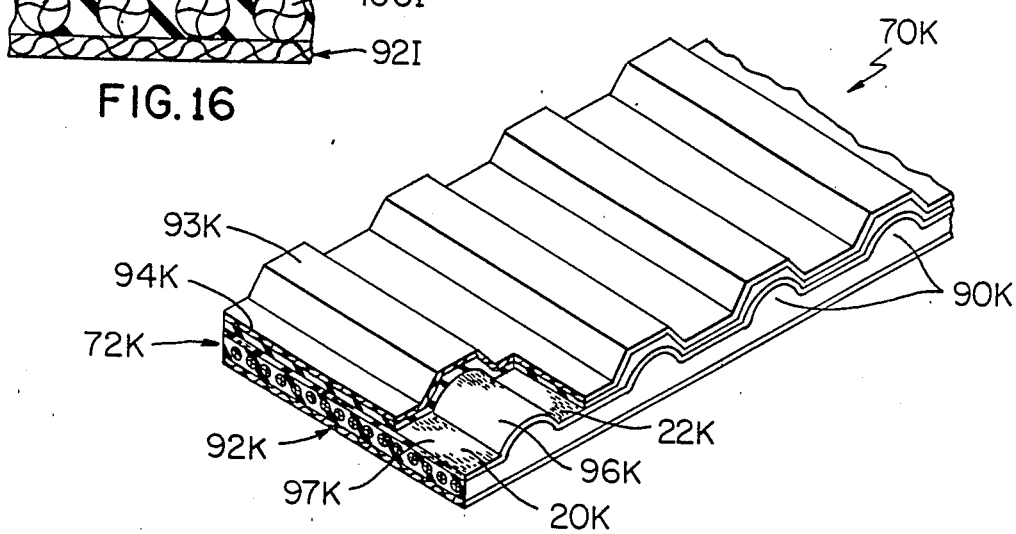
FIG.15

METHOD OF MAKING A FIBER-LOADED POLYMERIC SHEET

CROSS REFERENCE TO RELATED APPLICATION

This application is a divisional patent application of its copending parent patent application, Ser. No. 574,439, filed Jan. 27, 1984, now U.S. Pat. No. 4,634,413, which, in turn, is a divisional patent application of its copending parent patent application, Ser. No. 281,153, filed July 7, 1981, now U.S. Pat. No. 4,445,949.

BACKGROUND OF THE INVENTION

1. Field of the Invention

This invention relates to a method of making a fiber-loaded polymeric sheet particularly adapted for use in polymeric power transmission belts and to such belts utilizing same.

2. Prior Art Statement

It is known in the art to provide a flowable polymeric composition which has a plurality of discrete elongate fibers therein which are mixed together in a suitable mixing device, such as a Banbury mill, or the like, to define a fiber-loaded polymeric mass. The fiber-loaded mass is then processed through a suitable device, such as a cooperating pair of calendering rolls, to define a fiber-loaded sheet which has fibers aligned in substantially parallel relation.

However, in using the above techniques with fibers having lengths above approximately 3/16", there is a tendency for such fibers to roll into small balls, i.e., "pill", during mixing. Further, as the quantity of fibers relative to the quantity of polymeric material used to define the polymeric matrix therefor increases, there is a tendency for the entire batch of components being mixed to become hotter and the fiber dispersion to be comparatively poor. The net result is that fiber-loaded polymeric sheets made as described above are usually made with only roughly 20% of the fibers comprising same. In addition, previously used techniques, such as using calendering rolls, result in a maximum of about 50% of the fibers being disposed with their longitudinal axes in parallel relation whereby the above-described techniques have the deficiencies indicated.

It is also known in the art to provide a method of making a fiber-loaded polymeric sheet in a substantially continuous and uninterrupted manner wherein the method comprises the steps of disposing a quantity of discrete elongate fibers as a layer thereof on movable support means therefor which is movable along a rectilinear path and in a substantially horizontal plane, providing a quantity of liquid-containing polymeric material around the fibers during movement of the support means and the fibers, and removing the liquid contained in the liquid-containing polymeric material to define the sheet and as disclosed in U.S. Pat. No. 2,964,441.

It is also known to provide an endless power transmission belt which has at least one part or sheet portion thereof comprised of a polymeric material which has a plurality of elongate reinforcing fibers embedded therein and with the polymeric material serving as a matrix for the fibers. Examples of belts which use elongate reinforcing fibers in at least one part or sheet portion thereof are presented in the following patents, together with a brief comment on each patent:

(1) U.S. Pat. No. 3,416,383 discloses raw-edged belts which have oriented reinforcing fibers in various parts;

(2) U.S. Pat. No. 3,838,605 discloses a banded belt with belt bodies interconnected by a web using fibers;

(3) U.S. Pat. No. 3,839,116 discloses a belt having integral longitudinal ribs and which uses a fabric cover on the ribs and on the outside surface of the belt as well as fibers within the belt body;

(4) U.S. Pat. No. 3,863,515 discloses a belt using cords skewed in opposite directions on opposite sides of the load-carrying cord;

(5) U.S. Pat. No. 3,924,482 discloses a belt having a cover covering the entire belt body;

(6) U.S. Pat. No. 3,987,684 discloses raw-edged belts having centrally disposed load-carrying cords, fibers in various sections, and covers for the inside and outside surfaces thereof;

(7) U.S. Pat. No. 4,027,545 discloses various belts having inside and outside covers and a load-carrying section comprised of reinforcing fibers;

(8) U.S. Pat. No. 4,031,768 discloses various belts, including a belt with a toothed compression section, which use reinforcing fibers; and (9) U.S. Pat. No. 3,078,205 discloses a so-called synchronous type belt which uses a facing fabric for its belt teeth.

It is an object of this invention to provide an improved method of making a fiber-loaded polymeric sheet in a substantially continuous and uninterrupted manner.

Another object of this invention is to provide an improved endless power transmission belt which employs an improved fiber-loaded sheet of the character mentioned.

Other aspects, embodiments, objects, and advantages of this invention will become apparent from the following specification, claims, and drawings.

SUMMARY

In accordance with the present invention there is provided an improved method of making a fiber-loaded polymeric sheet in a substantially continuous uninterrupted manner with the method comprising the steps of, disposing a quantity of discrete elongate fibers as a layer thereof on movable support means therefor which is movable along a rectilinear path and in a substantially horizontal plane, providing a quantity of liquid-containing polymeric material around the fibers during movement of the support means and the fibers, and removing the liquid contained in the polymeric material to define the sheet.

In accordance with one embodiment of the improved method of this invention the disposing step comprises disposing the said quantity of fibers in substantially parallel relation and parallel to the rectilinear path, the providing step comprises providing the polymeric material so that it defines a substantially solid matrix for the fibers upon removing the liquid contained therein during the removing step, the disposing and providing steps comprise disposing the quantities so that following the removing step the quantity of fibers comprises between 40% and 70% of the sheet, and the method comprises the further step of stretching the sheet along the rectilinear path and parallel to the longitudinal axes of the fibers following the removing step to improve the parallelism of the fibers such that the final sheet has at least 70% of the said fibers in substantially parallel relation.

In accordance with another aspect of the invention an improved endless power transmission belt is provided which has at least one part thereof comprised of a polymeric material which has a plurality of elongate reinforcing fibers embedded therein with the polymeric material serving as a matrix for the fibers and wherein the fibers comprise between 40% and 70% of the part and at least 70% of the fibers are disposed in parallel relation.

BRIEF DESCRIPTION OF THE DRAWINGS

The accompanying drawings show present preferred embodiments of this invention, in which FIG. 1 is a fragmentary isometric view illustrating one exemplary embodiment of a fiber-loaded polymeric sheet made utilizing the method of this invention;

FIG. 2 is an isometric view with parts shown schematically and other parts broken away illustrating one exemplary embodiment of the method of this invention and associated apparatus employed in carrying out such method;

FIG. 3 is a fragmentary isometric view taken essentially on line 3—3 of FIG. 2;

FIGS. 4 through 15 are fragmentary isometric views showing various exemplary embodiments of endless power transmission belts wherein each belt uses a fiber-loaded polymeric sheet made in accordance with the method of this invention to define one or more parts thereof; and FIG. 16 is an enlarged fragmentary cross-sectional view of the belt of FIG. 13 which presents the dimensional arrangement of component parts thereof in a more precise manner.

DETAILED DESCRIPTION

Figure 4:
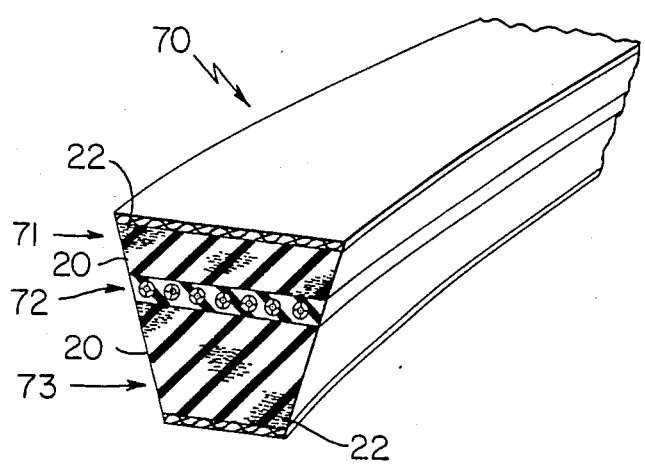

Reference is now made to FIG. 1 of the drawings which illustrates one exemplary embodiment of an uncured or unvulcanized fiber-loaded polymeric sheet made utilizing the method of this invention and such sheet is designated generally by the reference numeral 20. The method of making the sheet 20 will be described in detail subsequently; however, such sheet is comprised of a substantially solid polymeric material 21 which has elongate reinforcing fibers embedded therein with a representative few of such fibers being designated by the same reference numeral 22 and the polymeric material 21 serves as a matrix for the fibers 22.

The sheet 20 is particularly adapted for use in making endless power transmission belts comprised primarily of polymeric material and the sheet 20 is comprised of a greater quantity of fibers than similar sheets used previously to make endless belts, yet even with such greater quantity of fibers a larger percentage of fibers are disposed in parallel relation in the sheet 20 than the fibers of the previous sheets. In particular, the fibers 22 comprise between 40% and 70% of the sheet and the sheet 20 has at least 70% of the fibers in substantially parallel relation. The sheet 20 usually has generally of the order of 95% of its fibers 22 disposed in substantially parallel relation with the terminology "generally of the order of 95%" being intended to define that anywhere from 90% to 100% of the fibers are in substantially parallel relation.

The fibers 22 comprising the sheet 20 may be made of the same material or composition or of a plurality of different materials or compositions and basically such fibers are known in the art. However, in accordance with the teachings of this invention the fibers 22 have lengths ranging between roughly ¼ inch and 2 inches and such fibers have diameters ranging between five microns and several hundred microns.

Having described the sheet 20 in general terms the detailed description will now proceed, with specific reference being made to FIG. 2, with the method of making such sheet and such method will be designated generally by the reference numeral 24. The method 24 is particularly adapted for making the sheet 20 in a substantially continuous and uninterrupted manner and during the making of such sheet the flow of material is in a rectilinear flow path, from right to left as viewed in FIG. 2, and such path is indicated by the arrow 25.

The method 24 comprises various cooperating method steps and comprises disposing, at a disposing station 26, a quantity of discrete elongate fibers 22 as a layer thereof. A suitable disposing apparatus 27 may be used to dispose the fibers 22 and such apparatus is indicated schematically and may comprise a modified carding machine, or the like.

The fibers 22 are disposed at the disposing station 26 on movable support means which in this example is in the form of a suitable belt conveyor 30. The belt conveyor 30 is supported and moved by a pair of cooperating conveyor rolls 31 and 32 which employ conventional belt slack takeup means (not shown) for the rolls 31-32 which assure proper operation of the belt conveyor 30. The belt conveyor 30 is moved in an endless path by a drive for the roll 31 and such drive comprises a drive motor 33 which is operatively connected to the roll 31 by a suitable mechanical connection 34.

The belt conveyor 30 may be made of any suitable material capable of supporting the fibers 22 thereon in parallel relation and may employ known techniques to assure that the fibers remain parallel during subsequent processing. In addition, the belt conveyor 30 is such that it will retain a liquid-containing polumeric material (as will be described later) thereon, without loss, and in surrounding relation around the fibers 22. The belt conveyor 30 has a top portion 35 and a bottom portion 36. The top portion 35 may be considered as movable support means, for the fibers 22, which is movable along a rectilinear path parallel to the path 25 and in a substantially horizontal plane.

Following the disposing step at station 26, a quantity of liquid-containing polymeric material 21L is provided around the fibers 22 during movement of the support means or belt conveyor 30 and fibers 22. The polymeric material is provided at a providing station which is designated generally by the reference numeral 37 and the liquid-containing polymeric material 21L is provided from a suitable source thereof which is designated generally by the reference arrow 40. The polymeric material 21L is conveyed through a conduit 41 to a spray head 42 disposed above the belt portion 35 and fibers 22. The spray head 42 sprays the polymeric material 21L around the fibers during movement of the belt conveyor 30 and with fibers 22 thereon.

The method 24 also comprises removing the liquid contained in the polymeric material 21L to thereby define the sheet 20 which is, in essence, a sheet of uncured polymeric material loaded with fibers 22. The removal of liquid is achieved at a removing station 44; and, at such station 44 an apparatus 45, which is designated schematically, is provided and placed such that the belt conveyor 30 with the liquid containing polymeric material 21L and fibers 22 thereon is passed therethrough. The apparatus 45 provides a heated environment and thus may be in the form of a heat tunnel, or the like, and such heated environment serves to remove liquid contained in the polymeric material 21L and define the sheet 20 having a substantially solid uncured polymeric matrix 21 for the fibers 22. However, the action of the apparatus 45 at station 44 is not sufficient to provide any significant curing of the uncured matrix 21 so that the sheet 20 may be processed as is known in the art to define polymeric belts 70 and 70A through 70K and such belts will be described subsequently herein.

After removal of the liquid in the liquid-containing polymeric material 21L the sheet 20 is substantially self-supporting as illustrated at 46 and such sheet is then moved off the belt conveyor 30 for further processing. Immediately upon moving the sheet 20 off the belt conveyor, the top and bottom surfaces of such sheet are basically irregular, as is shown at 47 in FIG. 3.

The step of disposing fibers 22 at the disposing station 26 results in disposing a quantity of fibers 22 in substantially parallel relaion and parallel to the rectilinear path provided by the top portion 35 of the conveyor 30. Further, the step of providing liquid-containing polymeric material 21L at the providing station comprises providing the polymeric material 21L so that it defines a substantially solid matrix for the fibers upon removing the liquid contained therein during the removing step at the removing station 44. In addition, the disposing and providing steps which are achieved at stations 26 and 37 respectively, comprise disposing quantities of fibers 22 and polymeric material 21L so that following the removing step at the removing station 44 the quantity of fibers 22 comprises between 40% and 70% of the sheet 20.

The method of this invention also comprises the further step of stretching the sheet 20 along the rectilinear path 25 of movement of the fibers 22 and hence parallel to the longitudinal axes of the fibers; inasmuch as the elongate fibers are disposed with their longitudinal axes parallel to path 25. This stretching is achieved to improve the parallel-ism of the fibers 22. The stretching is achieved at a stretching station 50 employing an upstream pair 51 of cooperating rollers, each designated by the same reference numeral 52, and a downstream pair 53 of cooperating rollers, each designated by the same reference numeral 54. Each pair 51 and 53 of rollers compresses the sheet 21 therebetween in a substantially non-slipping manner; and, the upstream pair 51 of rollers is driven by a drive motor 55 through cooperating drive connections 56 each connected to an associated roller 52 at a particular rotational speed. The downstream pair 53 of rollers is similarly driven by a drive motor 57 through cooperating drive connections 60 each connected to an associated roller 54 at a greater rotational speed than the upstream pair of rollers whereby with each pair 51 and 53 of rollers compressing the sheet 20 therebetween in non-slipping engagement the results is that the sheet 20 is stretched as it moves between the pairs 51 and 53 of rollers. The resulting sheet is shown at 61 in FIG. 2 and is, in essence, the sheet of FIG. 1 which has at least 70% of its fibers 22 disposed in substantially parallel relation and preferably generally of the order of 95% of the fibers 22 are disposed in substantially parallel relation.

As previously mentioned, the support means for the sheet 21 is removed immediately following the removing station 44 by allowing the sheet 21 to move off an end of the belt conveyor 30 because the sheet 21 is substantially self-supporting after removal of the liquid from the polymeric material 21L. However, once the sheet 20 exits the removing station 44 it may be subjected to the further step of compacting such sheet perpendicular to the horizontal plane of the top portion 35 of the belt conveyor 30. The compacting is achieved at a compacting station 63; and, the compacting action at station 63 comprises compressing or compacting the sheet 20 between a pair 64 of cooperating compacting rollers each designated by the same reference numeral 65. The rollers 65 are suitably supported and controlled for precise movement toward and away from each other and are driven by a suitable drive motor 66 through cooperating drive connections 67 each connected to an associated roller 65. The compacting of the sheet 20 at station 63 serves to remove or smooth the top and bottom roughened surfaces of the sheet 20 which are shown in FIG. 3 and define such surfaces as flat planar surfaces, essentially as illustrated in FIG. 1.

The step of disposing fibers 22 at the disposing station comprises disposing fibers having sizes as previously described in connection with the description of the uncured sheet 20. It will also be appreciated that such fibers may be continuously supplied to the apparatus or machine 27 at station 26 using suitable supplying means which is designated schematically by the arrow 68.

The step of providing a liquid-containing polymeric material 21L at the providing station 37 may be providing liquid-containing polymeric material 21L having a water base or providing liquid-containing polymeric material having a liquid aromatic hydrocarbon base.

An example of a material 21L having a water base is presented in the following Table I; and, is comprised of the following constituents having parts in the overall composition as indicated.

TABLE I

| Constituent | Parts |
| --- | --- |
| neoprene latex (46% solids) | 218 |
| melamine formaldehyde resin | 4 |
| sulfur (70% solids) | 1 |
| antioxidant (50% solids) | 4 |
| Total parts | 227 |

An example of a material 21L having a liquid aromatic hydrocarbon base is presented in the following Table II; and, is comprised of the following constituents having parts in the overall composition as indicated.

TABLE II

| Constituent | Parts |
| --- | --- |
| neoprene | 100 |
| carbon black | 40 |
| high aromatic oil | 3 |
| antioxidant | 3 |
| magnesium oxide | 4 |
| stearic acid | 2 |
| zinc oxide | 5 |
| toluene | 630 |
| Total parts | 787 |

The sheet 20 due to its having an uncured matrix 21 may be considered an uncured polymeric sheet 20 and in this example is presented as an uncured fiber-loaded rubber sheet. The sheet 20 is particularly adapted to be used in making power transmission belts such as endless power transmission belts and may be of various thicknesses with the thickness thereof depending on its use in a belt. In general, the sheet 20 in its uncured state is used during the build-up of a particular belt, of belt sleeves from which belts are made, or of any other applicable component of a belt. Also the sheet 20 may be used in a plurality of layers to define a belt component.

Any technique known in the art may be used to make belts employing the sheet 20; and, because only certain polymeric belts per se are being claimed, a detailed presentation will not be made of the method of making each belt. Many of the patents identified in items 1 through 9 of the prior art statement presented in this specification disclose suitable method steps and techniques which may be used to make certain of the belts described herein using sheet 20 and the disclosures of all of these patents, of items 1 through 9, are incorporated herein by reference thereto. In any event, each belt 70 and 70A through 70K has at least one part or section thereof which is made using sheet 20 and is thus comprised of polymeric material and has a plurality of elongate reinforcing fibers embedded therein with the fibers comprising between 40% and 70% of the one part and with at least 70% of the fibers being disposed in parallel relation.

In the completed belts 70 and 70A through 70K the sheet 20 of this invention will have been used as will be described and will be referred to as part 20 and 20A through 20K with it being understood that each part 20 and 20A through 20K, in the completed belt is cured, together with the rest of the belt.

Reference is now made to FIG. 4 of the drawings which illustrates an exemplary belt which is designated generally by the reference numeral 70. The belt 70 has a tension section 71, a compression section 73, and a load-carrying section 72. The belt 70 is what is popularly referred to as a raw-edged belt, i.e., such belt has uncovered sides defining the non-parallel sides of the trapezoidal cross-sectional configuration. The belt 70 has the main part of its tension section 71 and of its compression section 73 exclusive of the outer covers thereof made of the sheet 20 and each of such main parts will be designated by the same reference numeral 20 and may be comprised of a plurality of layers of the sheet 20. Each main part 20 has fibers 22 disposed with their longitudinal axes substantially perpendicular to the longitudinal axis of the belt 70.

Other exemplary embodiments of belts of this invention are illustrated in FIGS. 5, 6, 7, 8, 9, 10, 11, 12, 13, 14 and 15. The belts illustrated in FIGS. 5, 6, 7, 8, 9, 10, 11, 12, 13, 14 and 15 all use the sheet 20 as a part thereof; and, such belts will be designated by the reference numerals 70A, 70B, 70C, 70D, 70E, 70F, 70G, 70H, 70I, 70J and 70K respectively and the sheet regardless of where used will be designated by the reference number 20 followed by the associated letter disignation (A through K) and not described again in detail as to its detailed composition, size of fibers, and arrangement of fibers, which are as previously described in connection with the sheet 20 of FIG. 1.

Figure 5:
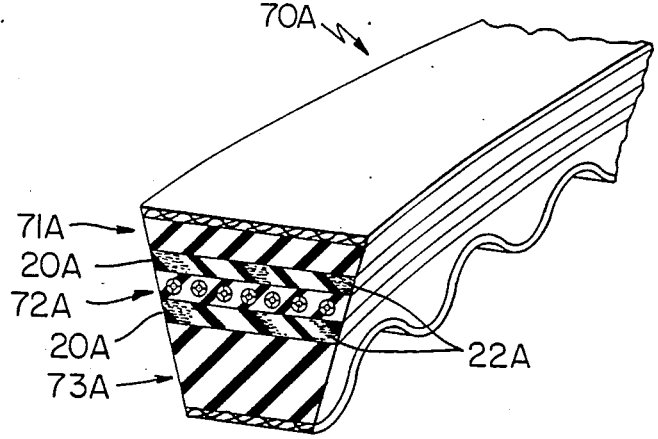

The belt 70A of FIG. 5 has a tension section 71A, a load-carrying section 72A, and a toothed compression section 73A. The belt 70A also has a pair of parts each designated by the same reference numeral 20A adjoining the top and bottom of the load-carrying section 72A with the parts 20A being defined as so-called platforms. One of the pair of platforms 20A is in the tension section 71A and defines the inner portion thereof and the other of the pair of platforms 20A is in the compression section and defines the inner portion of the compression section. The fibers 22A in each part 20A have their longitudinal axes disposed substantially perpendicular to the longitudinal axis of the belt 70A.

Figure 6:
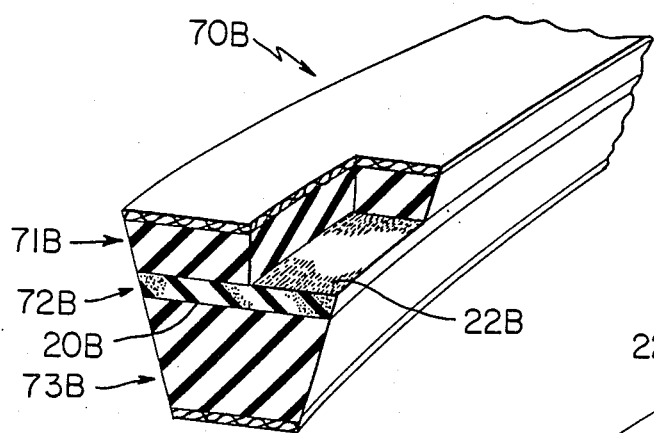

The belt 70B of FIG. 6 has a tension section 71B, a load-carrying section 72B, and a compression section 73B. The load-carrying section 72B is defined by a sheet or part 20B having fibers 22B therein and such fibers have their longitudinal axes disposed substantially parallel to the longitudinal axis of the belt 70B.

Figure 7:
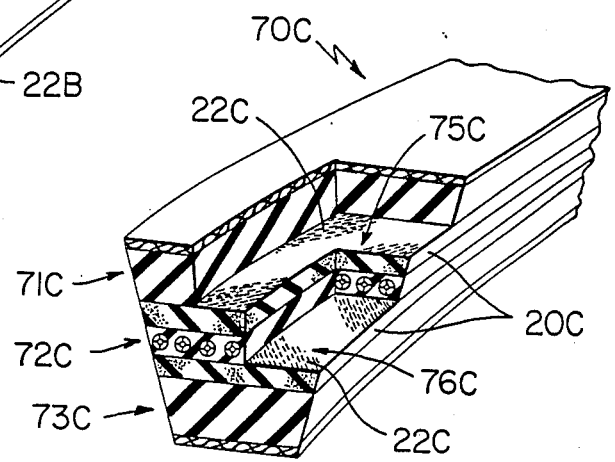

The belt 70C of FIG. 7 is what is popularly referred to as a central neutral axis (CNA) belt, i.e., the load-carrying section thereof is disposed centrally between the inside and outside surface of the belt 70C. The belt has a tension section 71C, a load-carrying section 72C, and a compression section 73C. The belt 70C has a pair of parts comprised of a pair of platforms 20C adjoining the top and bottom of the load-carrying section whereby one of the pair of platforms in the tension section and the other of the pair of platforms being in the compression section. One platform 20C of the pair has fibers 22C therein extending in one direction, as indicated at 75C, at an acute angle relative to the longitudinal axis of the belt 70C; and, the other platform 20C of the pair has fibers 22C therein extending in an opposite direction, as indicated at 76C, also at an acute angle relative to the longitudinal axis of the belt 70C. The acute angles of the fibers in the platforms are preferably equal although the fibers extend in opposite directions. This arrangement of the platforms serves to improve the torsional stiffness of the belt 70C.

The belt 70D of FIG. 8 is a so-called wrapped-molded belt and may be of any desired internal construction. The belt 70D has a plurality of parts each designated by the same reference numeral 20D defining a pair of adjoining layers or covers thereof. One cover 20D has the fibers 22D therein extending in one direction and at an angle relative to the longitudinal axis of the belt 70D and, the other cover 20D has the fibers 22D therein extending in an opposite direction and at an angle relative to the longitudinal axis of the belt and as shown at 80D. The angles of the fibers in the covers 20D are preferably equal even though the fibers extend in opposite directions.

The belt 70E of FIG. 9 has a tension section 71E, a load-carrying section 72E, and a compression section 73E. The belt 70E also has a plurality of parts comprised of a pair of outside covers 20E for each of its tension and compression sections. The pair of covers for the tension section define the outside portion of the belt 20E while the pair of covers for the compression section define the inside portion of the belt 70E. The covers 20E of the pair in each of the tension section and compression section have their fibers 22E extending in opposite directions and preferably at the same angle relative to the longitudinal axis of the belt 70E.

The belt 70F of FIG. 10 has a tension section 71F, a load-carrying section 72F, and a compression section 73F; and, it will be seen that such belt is in the form of a ribbed belt having a plurality of longitudinally extending ribs 81F defining the outer part of its compression section 73F. The belt 70F also has a cover 20F for its ribs 81F. The cover 20F extends along the entire undulating cross-sectional configuration of such ribs 81F and such cover 20F has fibers 22F disposed substantially parallel to the longitudinal axis of the belt 70F.

The belt 70G of FIG. 11 has a tension section 71G, a load-carrying section 72G, and a compression section 73G; and, it will be seen that this belt is also in the form of a ribbed belt having a plurality of longitudinally extending ribs 20G, as shown at 82G, defining the outer part of its compression section 73G.

The compression section 73G also has an inner part also designated 20G and shown at 83G which adjoins the load-carrying section 72G. The parallel fibers 22G in the inner part at 83G extend in one direction relative to the longitudinal axis of the belt 70G while the parallel fibers 22G in the individual ribs at 82G extend in an opposite direction relative to the longitudinal axis of the belt. The fibers in the inner part at 83G and in the belt elements at 82G though extending in opposite directions are at substantially the same angle relative to the longitudinal axis of the belt 70G.

The belt 70H of FIG. 12 is defined as a banded belt having a plurality of belt elements each designated by the reference numeral 86H. The belt elements 86H are held together by a tie band 87H and, the tie band 87H comprises a reinforcing layer 20H which has fibers 22H therein which have their longitudinal axes disposed in substantially parallel relation and perpendicular to the longitudinal axis of the belt 70H.

The belt 70I of FIG. 13 is in the form of a so-called synchronous or timing belt and such belt has a plurality of load-transmitting teeth 90I which are shown facing upwardly in the illustration of FIG. 13. The belt 70I also has a load-carrying section 72I and a portion 92I defining the usual outside portion of such belt. The teeth 90I have a facing cover 20I defining the exposed surfaces thereof. The cover has fibers 22I disposed perpendicular to the longitudinal axis of the belt 70I.

The belt 70J of FIG. 14 is also a synchronous or timing belt which has a plurality of load-transmitting teeth 90J which are also shown facing upwardly in the illustration of FIG. 14. The belt 70J also has a load-carrying section 72J and a portion 92J defining the outer portion of the belt. The belt 70J also has a facing cover 20J for its teeth 90J; however, the fibers 22J of the cover 20J have their longitudinal axes disposed substantially parallel to the longitudinal axis of the belt.

The belt 70K of FIG. 15 is also a synchronous or timing belt and has a load-carrying section 72K with load-transmitting teeth 90K on one side of section 72K and an outer portion 92K on the opposite side thereof. The teeth 90K have an undulating outside surface 93K defined by the outside surface of a facing fabric 94K. The belt 70K has an undulating reinforcing layer 20K disposed between the undulating outside surface 93K and the load-carrying section 72K; and, the reinforcing layer 20K has its fibers 22K disposed with their longitudinal axes perpendicular to the longitudinal axis of the belt 70K. The layer 20K is defined by roughly semicylindrical tubular portions 96K interconnected by flat rectangular portions 97K.

Reference is now made to FIG. 16 of the drawings which is an enlarged fragmentary cross-sectional view of the belt 70I and the showing of FIG. 16 would also be typical for the belts 70J and 70K with respect to the relative size and arrangement of each outer portion of each timing belt. In particular the outer portion shown as fabric in each belt 70I, 70J, and 70K is preferably against the load-carrying cord as shown for the helically wound cord 100I in FIG. 16. In addition, the fiber-loaded material (20I, 20J, or 20K) in each instance is against the opposite side of the load-carrying cord 100I. For example, in FIG. 16 the facing cover 20I is against the cord 100I.

While present exemplary embodiments of this invention have been illustrated and described it will be recognized that this invention may be otherwise variously embodied and practiced within the scope of the following claims.

What is claimed is:

1. In an endless power transmission belt having at least one part thereof comprised of polymeric material which has a plurality of elongate reinforcing fibers embedded therein with said polymeric material serving as a matrix for said fibers, the improvement in which said fibers comprise between 40% and 70% by weight of said one part and at least 70% of said fibers are disposed in parallel relation, said fibers each having a length that falls in the range between roughly one-fourth of an inch and two inches and having a diameter that falls in the range between roughly five microns and several hundred microns.

2. A belt as set forth in claim 1 in which said one part has generally of the order of 95% of said fibers disposed in said parallel relation.

3. A belt as set forth in claim 1 and which has a tension section, said one part defines the main part of said tension section, and said fibers have their longitudinal axes disposed substantially perpendicular to the longitudinal axis of said belt.

4. A belt as set forth in claim 1 and which has a compression section, said one part defines the main part of said compression section, and said fibers have their longitudinal axes disposed substantially perpendicular to the longitudinal axis of said belt.

5. A belt as set forth in claim 1 and which has a tension and a compression section, said one part is a platform in at least one of said tension section and said compression section, and said fibers have their longitudinal axes disposed substantially perpendicular to the longitudinal axis of said belt.

6. A belt as set forth in claim 1 and which has a load-carrying section, said one part defines said load-carrying section, and said fibers have their longitudinal axes disposed substantially parallel to the longitudinal axis of said belt.

7. A belt as set forth in claim 1 defined as a ribbed belt which has a compression section comprised of a plurality of longitudinally extending endless ribs, said one part comprises a cover for said ribs, and said fibers have their longitudinal axes disposed substantially parallel to the longitudinal axis of said belt.

8. A belt as set forth in claim 1 defined as a banded belt which has a plurality of endless belt elements and a tie band holding said belt elements together, said one part comprises a reinforcing layer in said tie band, and said fibers have their longitudinal axes disposed substantially parallel to the longitudinal axis of said belt.

9. A belt as set forth in claim 1 defined as a synchronous belt which has load-transmitting teeth, said one part comprises a facing cover for said teeth, and said fibers have their longitudinal axes disposed substantially perpendicular to the longitudinal axis of said belt.

10. A belt as set forth in claim 1 defined as a synchronous belt which has load-transmitting teeth, said one part comprises a facing cover for said teeth, and said fibers have their longitudinal axes disposed substantially parallel to the longitudinal axis of said belt.

11. A belt as set forth in claim 1 defined as a synchronous belt which has a load-carrying section and load-transmitting teeth, said teeth being defined by alternating projections and recesses having an undulating outside surface, said one part comprises a reinforcing layer disposed between said undulating outside surface and said load-carrying section, and said fibers have their longitudinal axes disposed substantially perpendicular to the longitudinal axis of said belt.

12. A belt as set forth in claim 12 and which has at least another part which is substantially identical to said one part, said other part also being comprised of polymeric material which has a plurality of elongate reinforcing fibers embedded therein with said fibers of said other part also comprising between 40% and 70% by weight thereof and with at least 70% of the fibers of said other part being disposed in parallel relation and with each fiber of said other part having a length that falls in the range between roughly one-fourth of an inch and two inches and having a diameter that falls in the range between roughly five microns and several hundred microns whereby said belt is comprised of a plurality of said parts.

13. A belt as set forth in claim 12 in which each of said parts has generally of the order of 95% of its fibers disposed in said parallel relation.

14. A belt as set forth in claim 12 and which comprises a tension section and a compression section, said parts define the main parts of said tension section and of said compression section, and said fibers in said parts have their longitudinal axes disposed substantially perpendicular to the longitudinal axis of said belt.

15. A belt as set forth in claim 12 defined as a wrap-molded belt, said parts comprise a pair of adjoining covers for said belt, and one of said covers has the fibers therein extending in one direction at a first angle relative to the longitudinal axis of said belt while the other of said covers has the fibers therein extending in an opposite direction and at a second angle relative to the longitudinal axis of said belt, said first and second angles being substantially equal.

16. A belt as set forth in claim 12 defined as a raw-edged belt of trapezoidal cross-section configuration which has a tension section and a compression section, said parts comprise a pair of adjoining covers for said tension section and a pair of adjoining covers for said compression section, and said pair of covers for said tension section defining the outer portion of said belt with said pair of covers for said compression section defining the inner portion of said belt.

17. A belt as set forth in claim 12 defined as a ribbed belt having longitudinally extending endless ribs and which has a compression section, and said parts comprise said ribs which define the outer portion of said compression section and an inner layer which defines the inner portion of said compression section.

18. A belt as set forth in claim 12 and which comprises a load-carrying section having top and bottom surfaces, said parts comprise a pair of platforms adjoining said top and bottom surfaces.

19. A belt as set forth in claim 18 and which also comprises a toothed compression section, said fibers in said pair of platforms have their longitudinal axes disposed substantially perpendicular to the longitudinal axis of said belt.

20. A belt as set forth in claim 18 defined as a central neutral axis belt in which one of said pair of platforms has the fibers therein extending in one direction at a first acute angle relative to the longitudinal axis of said belt and the other of said pair of platforms has the fibers therein extending in an opposite direction and at a second acute angle relative to the longitudinal axis of said belt, and said first and second angles are substantially equal.

* * * * *